(12) United States Patent
Okada

(10) Patent No.: US 6,906,747 B2
(45) Date of Patent: Jun. 14, 2005

(54) ELECTRONIC CAMERA FOR PERFORMING GRADATION CONVERSION ON AN IMAGE SIGNAL

(75) Inventor: Sadami Okada, Sakado (JP)

(73) Assignee: Nikon Corporation, Tokyo (JP)

( * ) Notice: Subject to any disclaimer, the term of this patent is extended or adjusted under 35 U.S.C. 154(b) by 839 days.

(21) Appl. No.: 09/913,062
(22) PCT Filed: Mar. 26, 2001
(86) PCT No.: PCT/JP01/02411
§ 371 (c)(1), (2), (4) Date: Aug. 9, 2001
(87) PCT Pub. No.: WO01/76235
PCT Pub. Date: Oct. 11, 2001

(65) Prior Publication Data
US 2004/0201757 A1 Oct. 14, 2004

(30) Foreign Application Priority Data
Apr. 3, 2000 (JP) ........................ 2000-101470

(51) Int. Cl.$^7$ .................. H04N 5/217; H04N 5/202; G03F 3/08; G06K 9/00
(52) U.S. Cl. .................. 348/241; 348/674; 348/254; 358/521; 382/169
(58) Field of Search .................. 348/241, 242, 348/252, 253, 257, 250, 254, 255, 256, 606, 615, 627, 651, 674; 358/521; 382/167, 169

(56) References Cited

U.S. PATENT DOCUMENTS

| | | | | |
|---|---|---|---|---|
| 5,047,861 A | * | 9/1991 | Houchin et al. ............. | 348/254 |
| 5,481,317 A | * | 1/1996 | Hieda ........................ | 348/254 |
| 5,517,333 A | * | 5/1996 | Tamura et al. .............. | 358/521 |
| 5,708,729 A | | 1/1998 | Adams et al. | |
| 5,859,927 A | | 1/1999 | Adams et al. | |
| 5,974,190 A | * | 10/1999 | Maeda et al. ............... | 382/255 |
| 6,040,860 A | * | 3/2000 | Tamura et al. .............. | 358/521 |
| 6,160,532 A | * | 12/2000 | Kaburagi et al. ........... | 348/674 |
| 6,433,823 B1 | * | 8/2002 | Nakamura et al. .......... | 348/254 |
| 6,433,838 B1 | * | 8/2002 | Chen ........................... | 348/674 |
| 6,697,127 B2 | * | 2/2004 | Suzuki ....................... | 348/674 |

FOREIGN PATENT DOCUMENTS

| | | | | |
|---|---|---|---|---|
| JP | 07221987 A | * | 8/1995 | .......... H04N/1/407 |
| JP | A-63-290028 | | 11/1998 | |
| JP | 11170572 A | * | 6/1999 | .............. B41J/2/21 |
| JP | 2000307939 A | * | 11/2000 | .......... H04N/5/235 |
| JP | 2000354179 A | * | 12/2000 | ............ H04N/5/20 |

OTHER PUBLICATIONS

Watanabe et al.; "Gradation Conversion by a Sigmoid Function in a Digital Camera System"; Japanese Hardcopy 2000 Collected Papers B–27; The Imaging Society of Japan.*

* cited by examiner

Primary Examiner—Wendy R. Garber
Assistant Examiner—John Villecco
(74) Attorney, Agent, or Firm—Oliff & Berridge, PLC

(57) ABSTRACT

The present invention performs gradation conversion linearly on an image signal when the image signal is darker than a preset value. Consequently, the dark region of the image is not distorted nonlinearly, and the gradations of shadows and hair can be reproduced in full richness. On the other hand, gradation conversion is performed nonlinearly on image signals if the image signal is brighter than a preset value. The nonlinear conversion in this case: (1) has a slope that effectively equalizes an average noise amplitude of the image signal without being based on the output gradation value, and (2) is offset so as to be continuous with the gradation conversion characteristic of the dark area gradation conversion unit. Through condition (1), the level-dependent noise in the bright region is equalized. Furthermore, through condition (2), gradation differences and gradation reversals do not occur at the boundary between the dark region and the bright region.

10 Claims, 8 Drawing Sheets

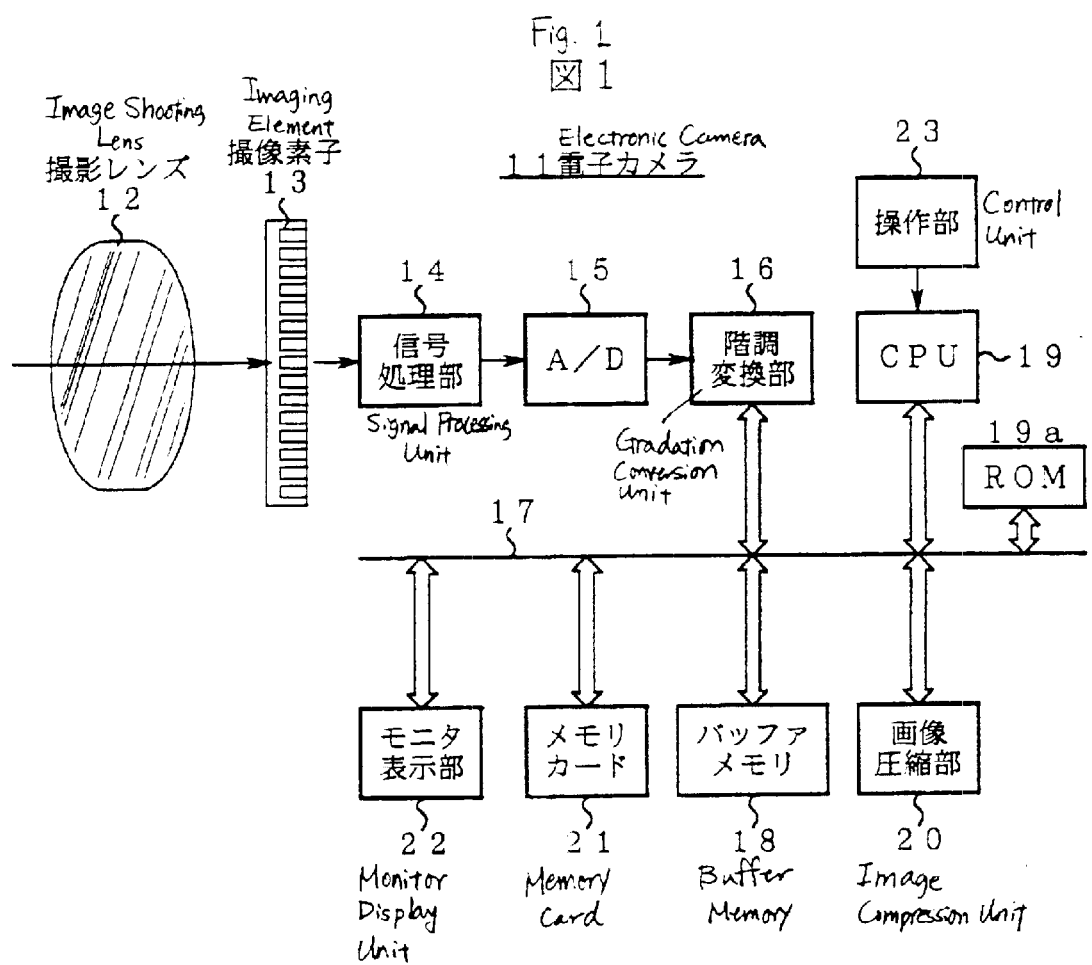

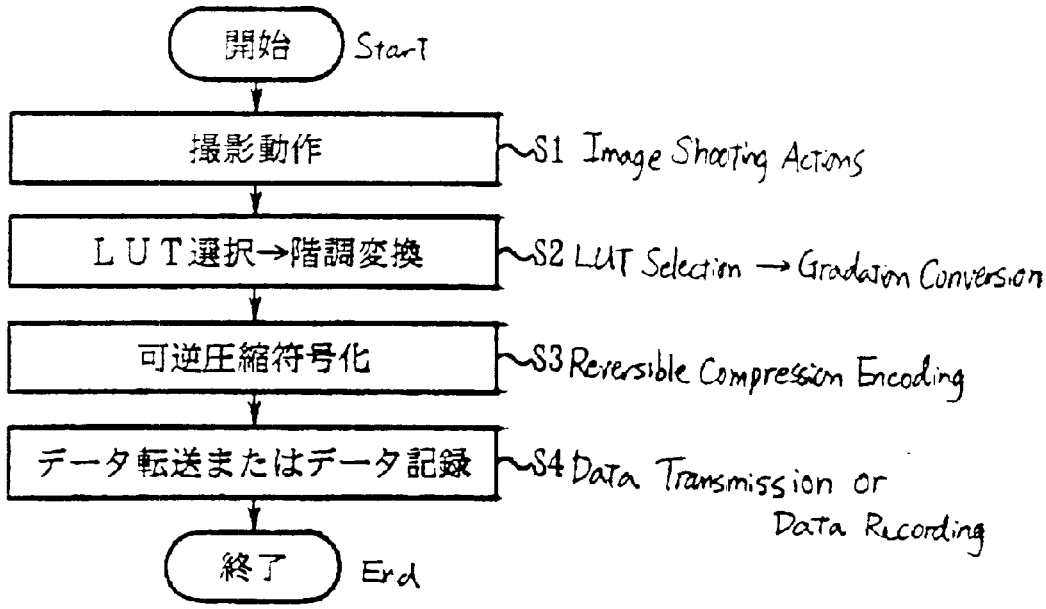

Fig. 2 図2 撮影時の動作 Actions During Image Shooting
- 開始 Start
- S1 撮影動作 Image Shooting Actions
- S2 LUT選択→階調変換 LUT Selection → Gradation Conversion
- S3 可逆圧縮符号化 Reversible Compression Encoding
- S4 データ転送またはデータ記録 Data Transmission or Data Recording
- 終了 End

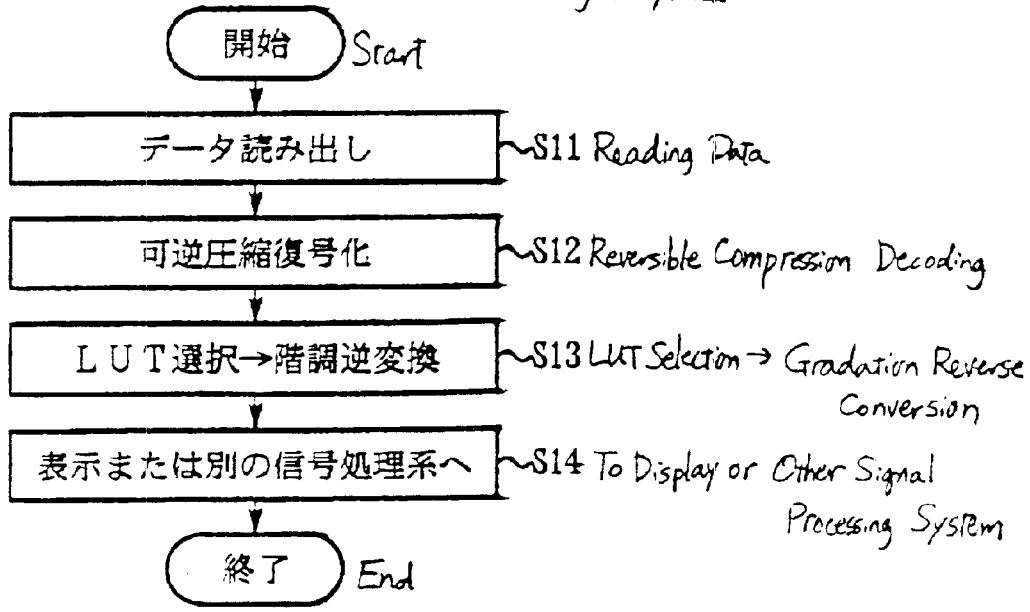

Fig. 3 図3 再生時の動作 Actions During Playback
- 開始 Start
- S11 データ読み出し Reading Data
- S12 可逆圧縮復号化 Reversible Compression Decoding
- S13 LUT選択→階調逆変換 LUT Selection → Gradation Reverse Conversion
- S14 表示または別の信号処理系へ To Display or Other Signal Processing System
- 終了 End

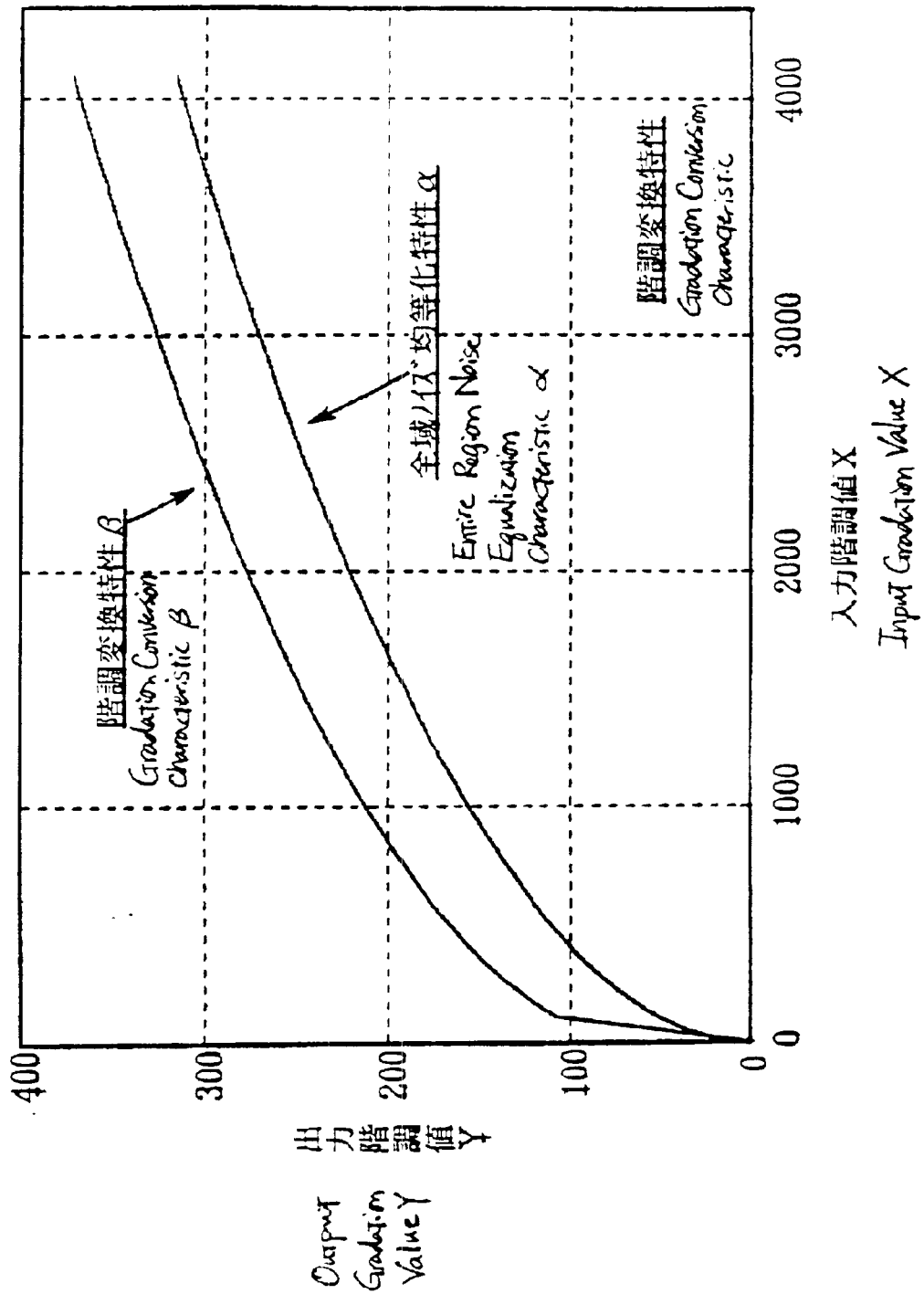

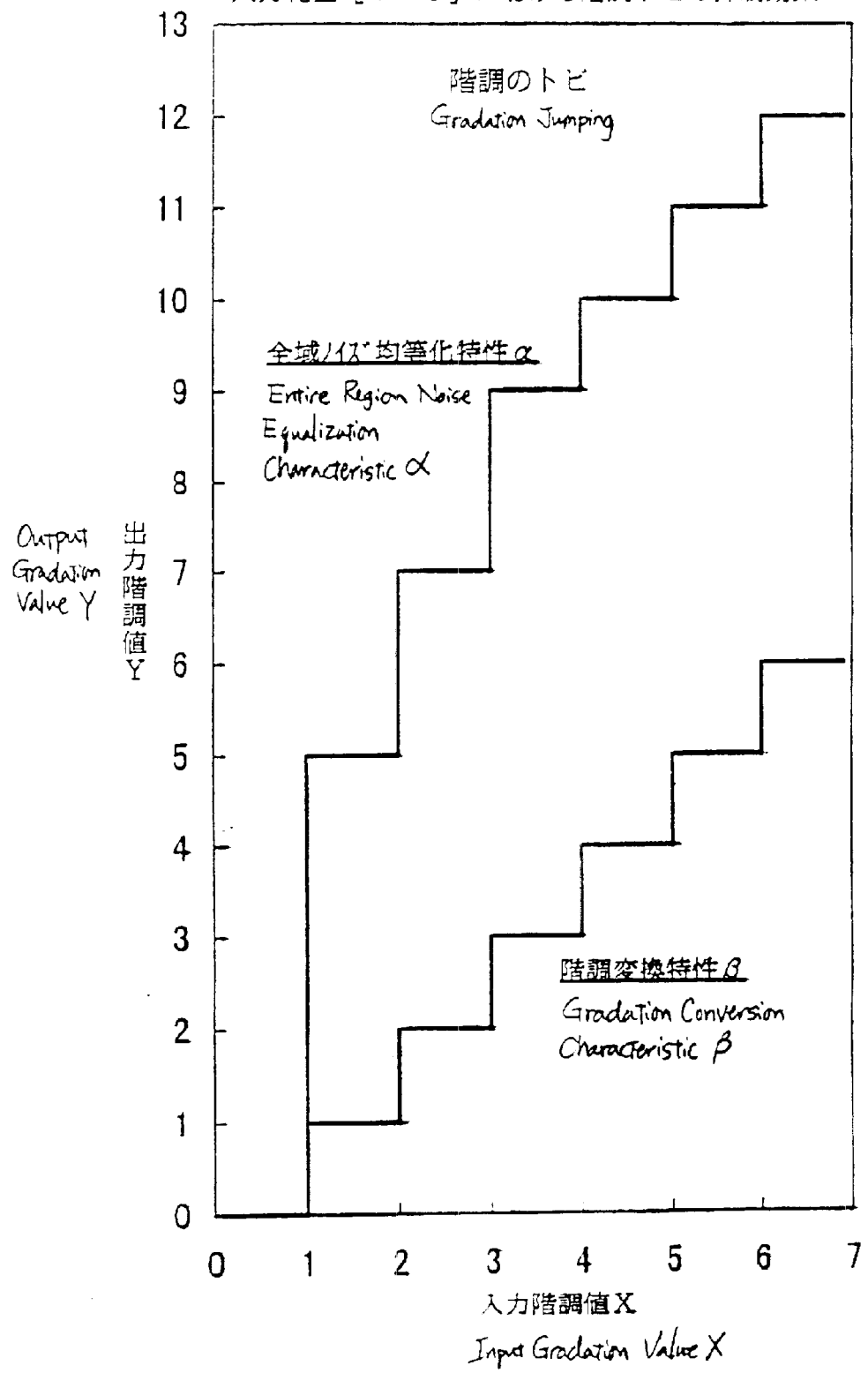

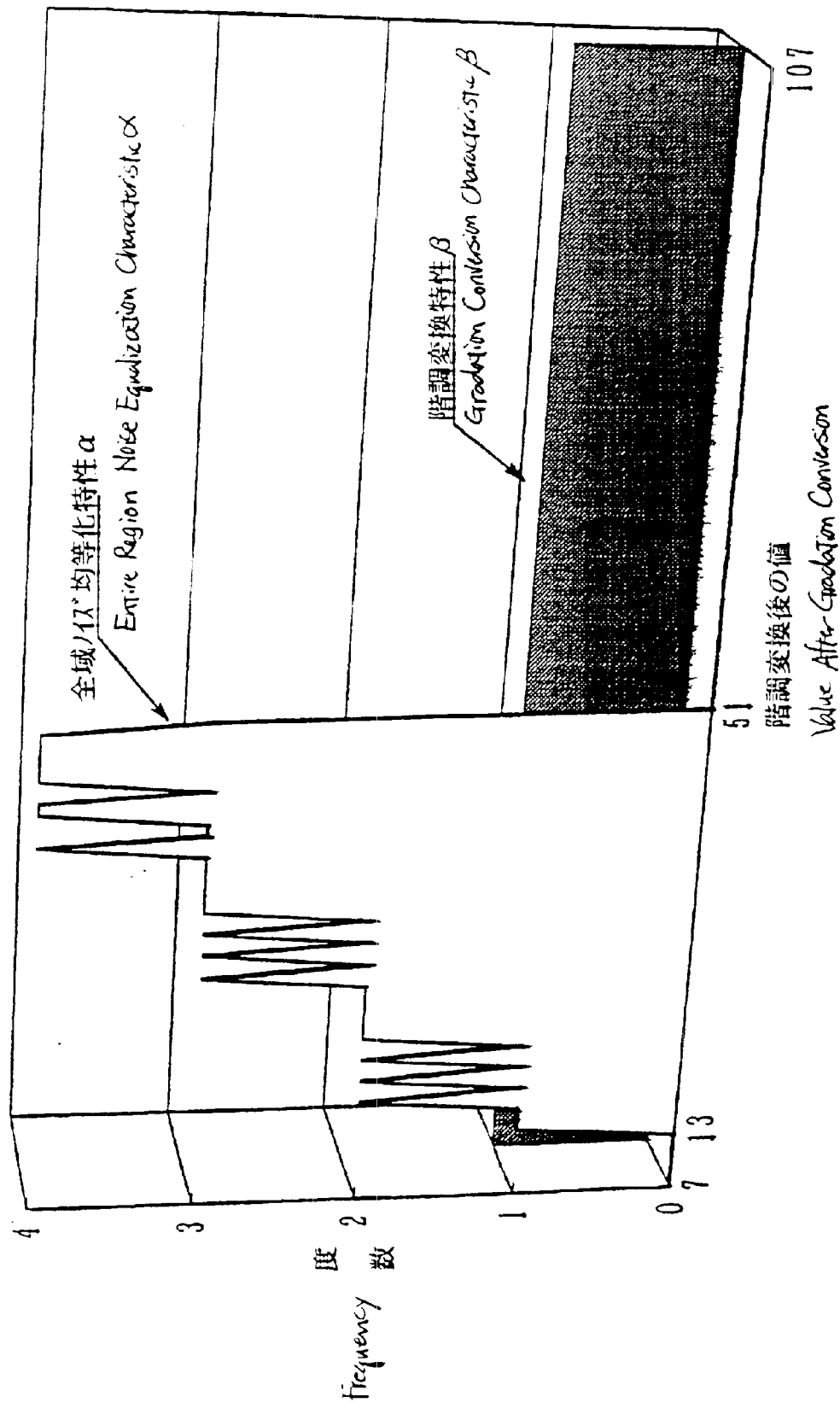

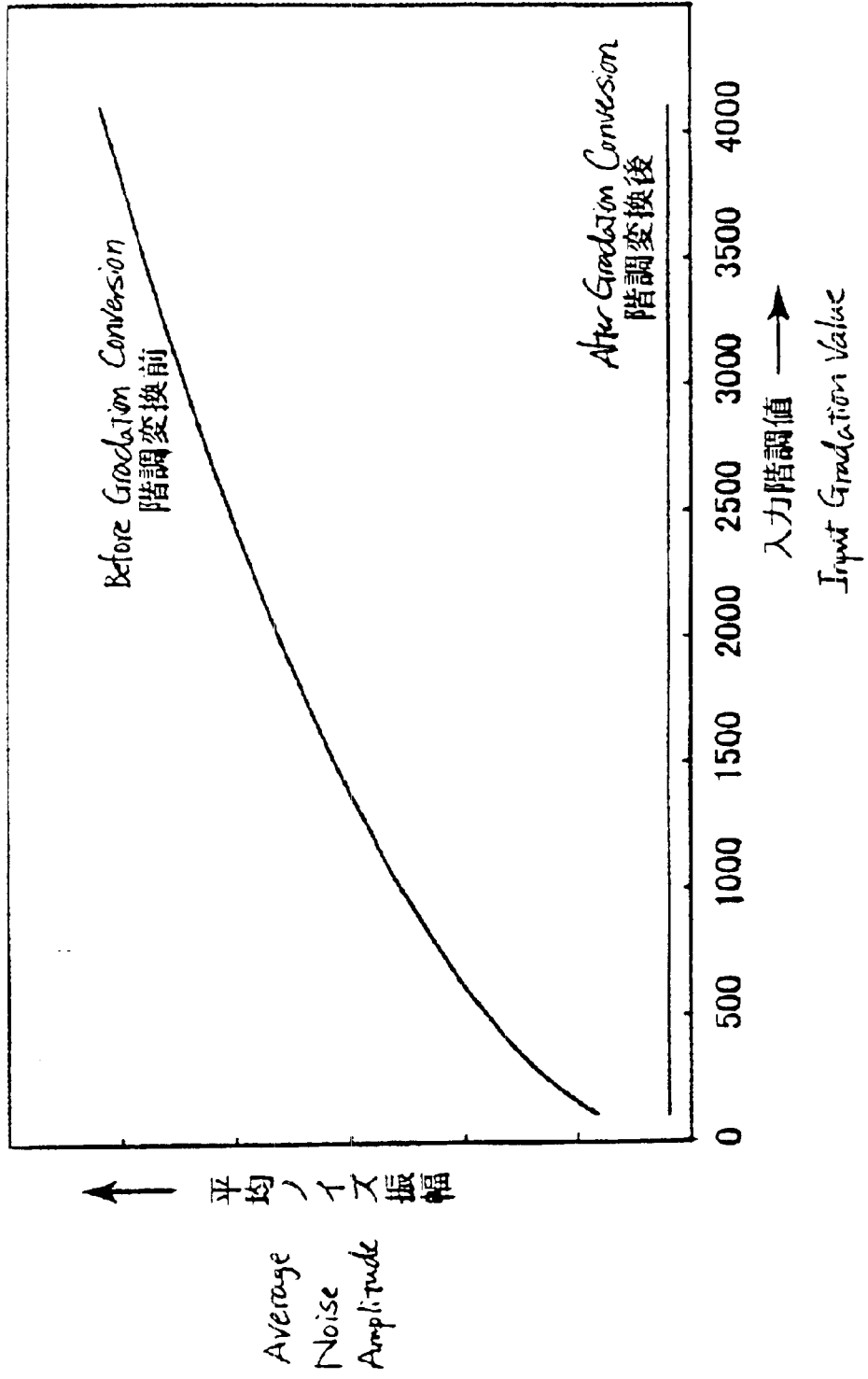
Fig. 7 Efficacy of Equalizing Noise Amplitude in Input Range [108-4095]

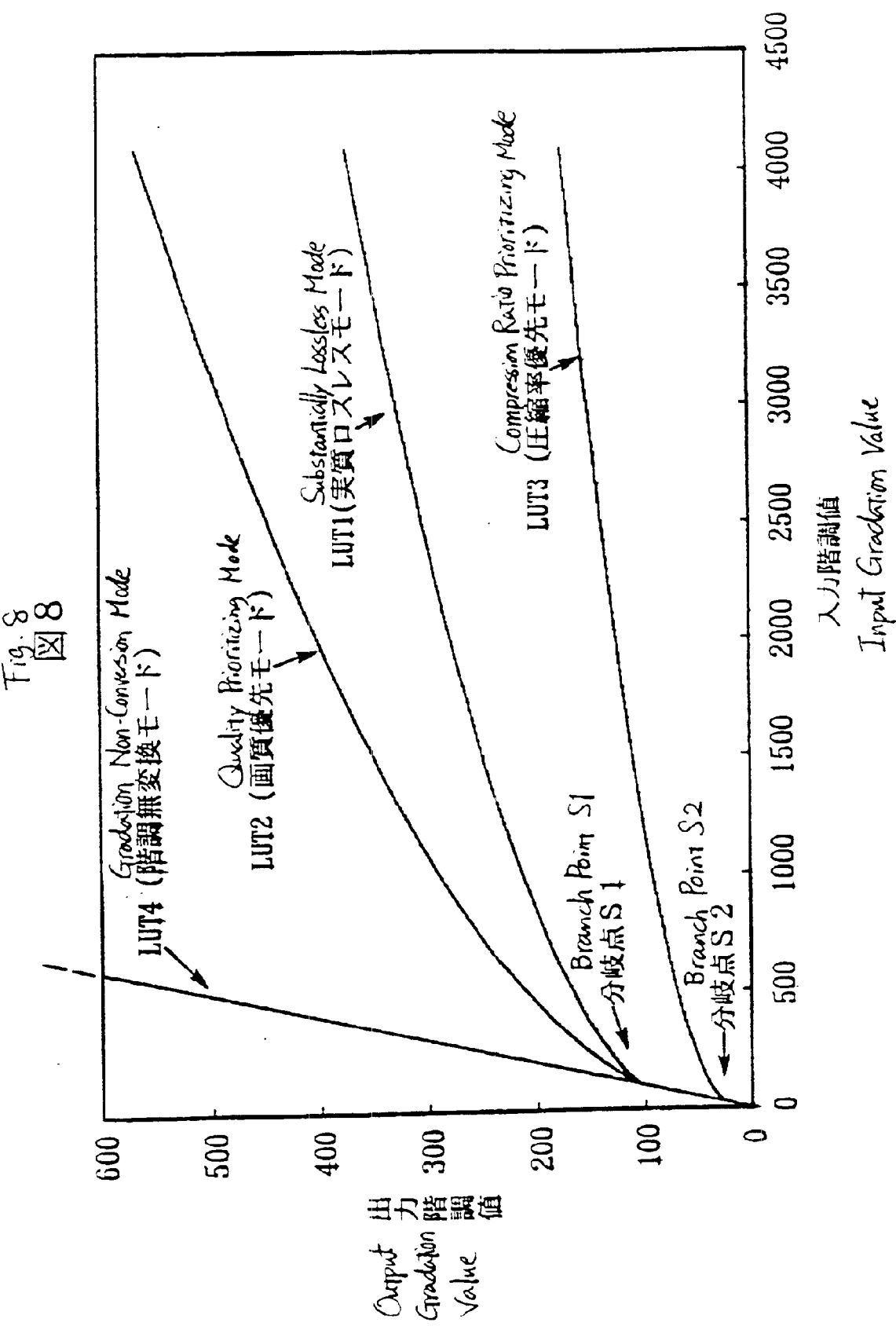

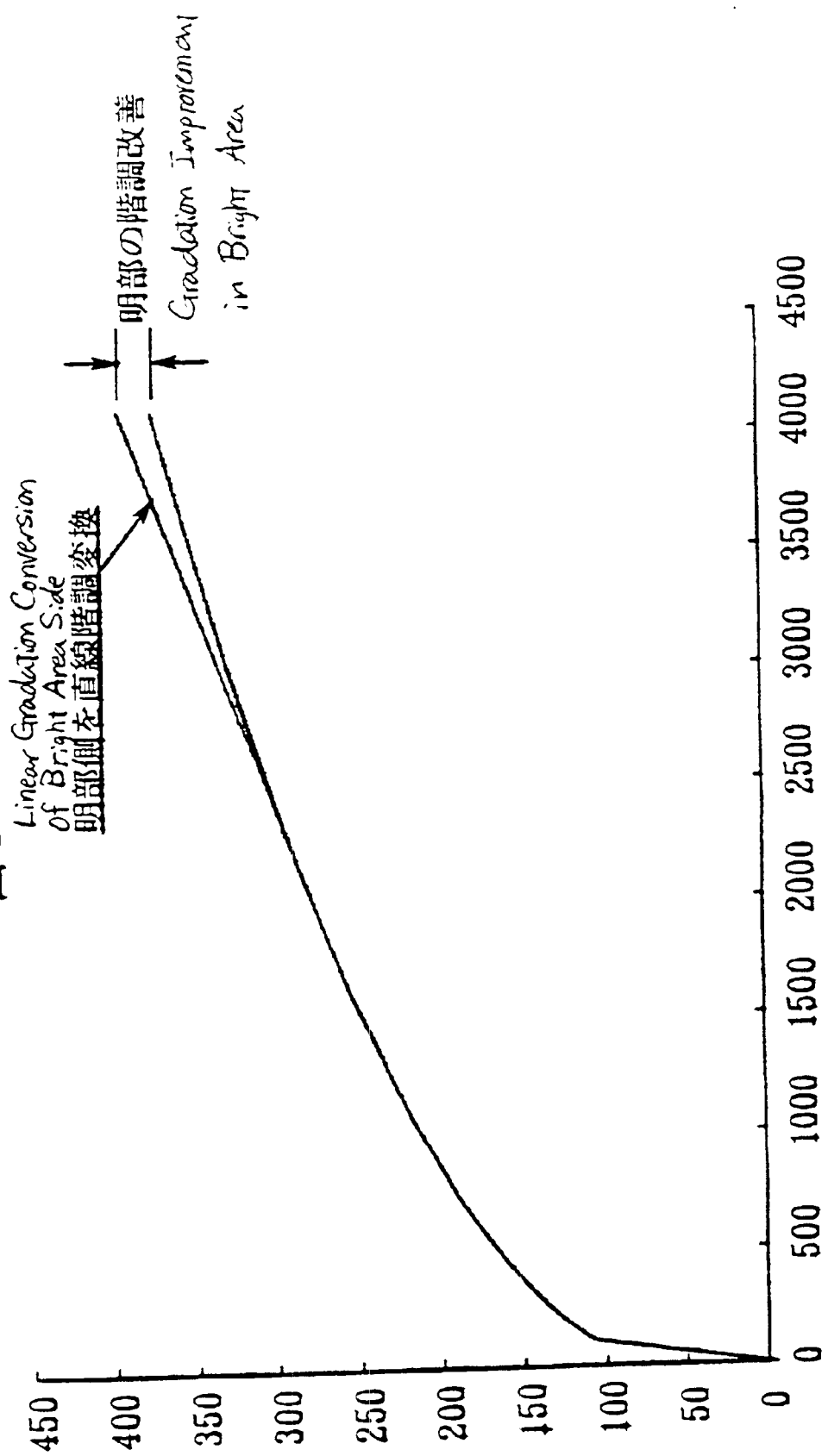

ELECTRONIC CAMERA FOR PERFORMING GRADATION CONVERSION ON AN IMAGE SIGNAL

FIELD OF THE INVENTION

The present invention relates to an electronic camera in which gradation conversion is performed on a photographed image signal.

The present invention relates to an image processing program for allowing gradation conversion of image signals on the computer, and a recording medium for such.

The present invention relates to an image processing method for performing gradation conversion on an image signal.

DESCRIPTION OF BACKGROUND ART

A signal conversion technology is known which accomplishes nonlinear gradation conversion of image signals based on the dependency between the input gradation value and the average noise amplitude and evenly eliminates the noise across all gradation regions.

For instance, a signal converter that accomplishes gradation conversion according to the following equation is disclosed in Japanese Laid-Open Patent Publication No. 63-290028.

$$Y = c \int_b^X [1/n(\xi)] d\xi \quad [1]$$

where X is an input gradation value, Y is an output gradation value, $\xi$ is the variable of integration, $n(\xi)$ is an average noise amplitude in the input gradation value $\xi$, and b and c are independently determined constants.)

By undertaking both the gradation conversion of this Equation [1] and quantification, it is possible to evenly eliminate the noise regardless of the size of the output gradation value Y, and to effectively reduce the volume of information in the image signal.

Furthermore, by restoring the gradation of the output gradation value Y after quantification using the reverse conversion of Equation [1], it is possible to obtain a restored image signal with reduced noise.

However, the inventor of the invention of the present application conceived the idea of a gradation conversion for equalizing the shot noise that depends on the input gradation value X. (This equalization of the shot noise is not described in Japanese Laid-Open Patent Application No. 63-290028 and had not been known at the time of filing this application.)

However, when the gradation conversion for the equalization of the shot noise was tested, noncontinuous gradation level differences (known as "jumps") occurred in the image signal after gradation restoration, creating the problem that the rich sense of gradation was easily lost.

In particular, because the dark gradation region is amplified considerably during the course of shot noise equalization, the output gradation value Y becomes a discrete value. Moreover, because minute fixed pattern noise and/or dark current in this dark gradation region are amplified considerably during the course of the shot noise equalization, they become more noticeable.

DISCLOSURE OF THE INVENTION

An object of the present invention is to obtain both effective reduction of unnecessary information and good image quality in gradation conversion of image signals.

Hence, the electronic camera of the present invention is an electronic camera that performs the gradation conversion on photographed image signals, and is comprised of a dark area gradation conversion unit that performs gradation conversion on an image signal in accordance with linear conversion characteristics when the input gradation value of the image signal is darker than a predetermined value; and a bright area gradation conversion unit that performs gradation conversion on an image signal in accordance with a nonlinear characteristic when the input gradation value of said image signal is brighter than a preset value; wherein the nonlinear characteristic satisfies both of the following conditions: (1) the nonlinear characteristics have a slope that substantially equalizes the average noise amplitude of the image signal without being based on the output gradation value; and (2) the nonlinear characteristics are offset so as to be continuous with the gradation conversion characteristic of the dark area gradation conversion unit.

In this dark area gradation conversion unit, the gradation conversion is performed using a linear conversion characteristic with respect to an area in which the input gradation value of the image signal is darker than a predetermined value (hereafter, referred to as a "dark region"). This dark region originally has a small signal level, and hence there is little level-dependent noise, such as shot noise. Consequently, in the dark region, there is little disadvantage even if the level-dependent noise is not equalized. In contrast, by performing linear conversion on this dark region, non-linear jumping or collapsing does not occur in the output gradation value, and therefore, it is possible to maintain the gradation feel of shadows, hair and the like. In addition, the solid pattern noise of the dark region is less likely to become noticeable.

On the other hand, in the bright area gradation conversion unit, a nonlinear gradation conversion meeting the above-described conditions (1) and (2) is performed with respect to an area in which the input signal the input gradation value is brighter than a predetermined value (hereafter, referred to as a "bright region"). At this time, by meeting condition (1), the average noise amplitude of the bright region is equalized without being based on the output gradation value. As a result, when the output gradation value is quantified, it is possible to substantially uniformly eliminate the noise in the bright region. In addition, it is possible to efficiently reduce the amount of information in the output gradation value by the amount of the noise (useless information) eliminated by the quantification.

Furthermore, through condition (2), the output gradation value is offset so that continuity with the output gradation value of the dark region is maintained. Accordingly, at the image boundary between the bright region and the dark region, it is possible to naturally link gradations without jumping or reversals in the gradation. In addition, when performing gradation restoration, it is possible to simply perform the gradation restoration since gradation reversal does not occur at this image boundary.

Thus, with the electronic camera of the present invention, it is possible to well obtain both efficient reduction of useless information and good image quality through the above-described gradation conversion operation.

More preferably, the dark area gradation conversion unit outputs the input gradation value X as the output gradation value Y without any changes. In this case, the input gradation value X is output without any changes as the output gradation value Y in the dark region of the image. Consequently, the gradation feel in the dark region (e.g., the object's shadow or hair) is substantially perfectly preserved. Accordingly, it is possible to obtain reproduced images (or image prints or the like) with rich gradation in the dark region accurately and easily.

More preferably, the bright area gradation conversion unit outputs an output gradation value Y in accordance with the following equation:

$$Y = A \cdot \sqrt{X} + C \quad [2]$$

(where X is the input gradation value, A is a proportionality coefficient and C is the offset value adjusted for making continuous with the characteristic of the dark area gradation conversion unit.)

Normally, the average noise amplitude Nx of the shot noise in the input gradation value X is expressed as $$Nx = B \cdot \sqrt{X} \quad [3]$$

where B is a proportionality coefficient.

In this case, the average noise amplitude Ny included in the output gradation value Y after gradation conversion using Equation [2] is given by:

$$Ny \approx Nx \cdot (dY/dX) = A \cdot B/2 = \text{constant} \quad [5]$$

and is effectively equalized without being based on the output gradation value Y.

Accordingly, by executing the gradation conversion of Equation [2], it is possible to efficiently perform gradation compression of the shot noise in the bright region, and to reduce efficiently the amount of useless information.

Furthermore, in Equation [2], continuity with the output gradation value of the dark region can be maintained by adjusting the offset value C. Accordingly, at the image boundary between the bright region and the dark region, it is possible to naturally link gradations without jumping or unnecessary reversals occurring in the gradation.

More preferably, when the input gradation value of the image signal is brighter than a second preset value, the bright area gradation conversion unit performs gradation conversion of the image signal in accordance with a linear conversion characteristic that continues with the nonlinear gradation conversion characteristic. In this case, the bright area gradation conversion unit performs gradation conversion of the image signal using the linear conversion characteristic continuous with the nonlinear gradation conversion characteristic in a region in which the input gradation value of the input signal is brighter than a second preset value (hereafter referred to as the "brightest region").

Accordingly, in the brightest region, nonlinear collapse does not occur in the image signal, making it possible to increase the gradation reproducibility in the brightest region (e.g., the indentation pattern of a white cup). In addition, because the gradation conversion characteristic is continuous between the bright region and the brightest region, at the image boundary between the bright region and the brightest region, it is possible to naturally link gradations without jumping or reversals occurring in the gradation.

More preferably, for the bright area gradation conversion unit and the dark area gradation conversion unit, at least two combinations of gradation conversion characteristics are provided in advance, and either one of these can be selected. In this case, by combining the respective gradation conversion characteristics of the bright region and the dark region, it is possible to create various combinations of gradation characteristics more freely and easily than has conventionally been possible. The user (or the electronic camera) can then the appropriately select and execute a more suitable gradation conversion from among these combinations.

More preferably, a data compression unit is provided that can select and execute a "first compression mode that compresses the data of the image signal after performing gradation conversion on the image signal through the dark area gradation conversion unit or the bright area gradation conversion unit", and a "second compression mode that compresses the data of the image signal without passing through the dark area gradation conversion unit or the bright area gradation conversion unit."

In this case, by selecting and executing the first compression mode, it becomes possible to create compressed image data effectively realizing both efficient reduction and good image quality of the useless information.

On the other hand, by selecting and executing the second compression mode, efficient reduction of useless information using the gradation compression is not performed through, but it becomes possible to create compressed image data of high quality with high gradation reproducibility.

More preferably, a data compression unit is provided that can select and perform a "first compression mode that compresses the data of the image signal after performing gradation conversion on the image signal through the dark area gradation conversion unit or the bright area gradation conversion unit," and a "non-compression mode that compress the data of the image signal without passing through the dark area gradation conversion unit or the bright area gradation conversion unit.

In this case, by selecting and executing the first compression mode, it becomes possible to create compressed image data effectively realizing both efficient reduction of useless information and good image quality.

On the other hand, by selecting and executing the non-compression mode, efficient reduction of the useless information using the gradation compression is not performed, but it becomes possible to create image data of high quality with high gradation reproducibility.

More preferably, an image processing program is created in order to cause a computer to function as the above-described dark area gradation conversion unit and bright area gradation unit. In addition, a recording medium is created that records this image processing program. In this case, by executing the image processing program on the computer, it is possible to perform on the computer the gradation conversion process similar to the above-described electronic camera.

More preferably, by making the same processes similar to the above-described dark area gradation conversion unit and bright area gradation conversion unit as steps, the process may be executed as an image processing method.

The above-described object, as well as other object, of the present invention may be easily verified through the below explanation and attached drawings.

BRIEF DESCRIPTION OF DRAWINGS

FIG. 9 is a diagram showing the gradation conversion characteristic for performing linear conversion in the brightest region.

BEST MODE FOR EXECUTING THE INVENTION

Hereafter, the preferred embodiments of the present invention will be described with reference to the drawings.

First Embodiment

Figure 1:
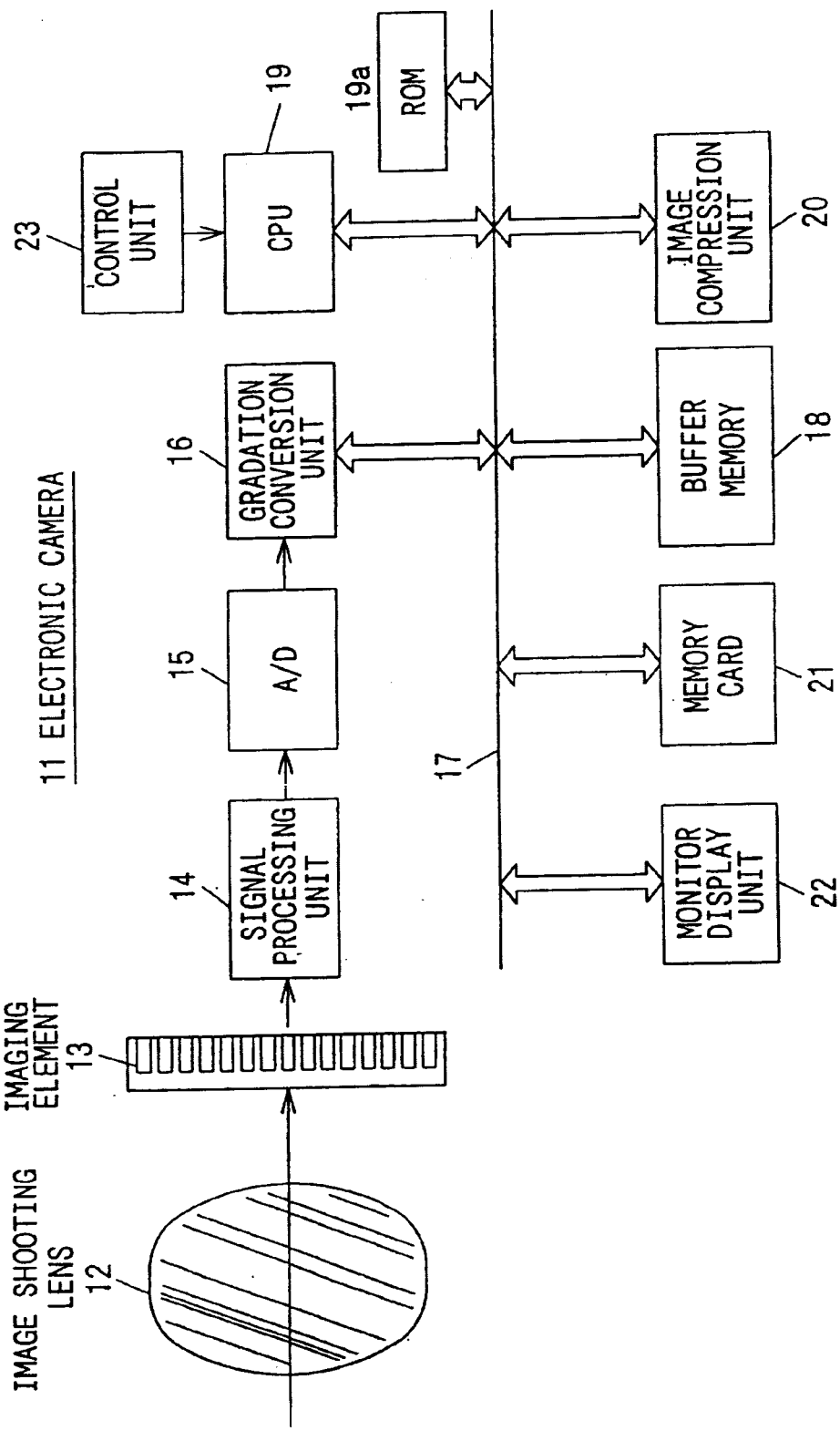
FIG. 1 is a block diagram showing the composition of an electronic camera 11.

FIG. 1 is a block diagram showing the composition of an electronic camera 11.

Figure 2:
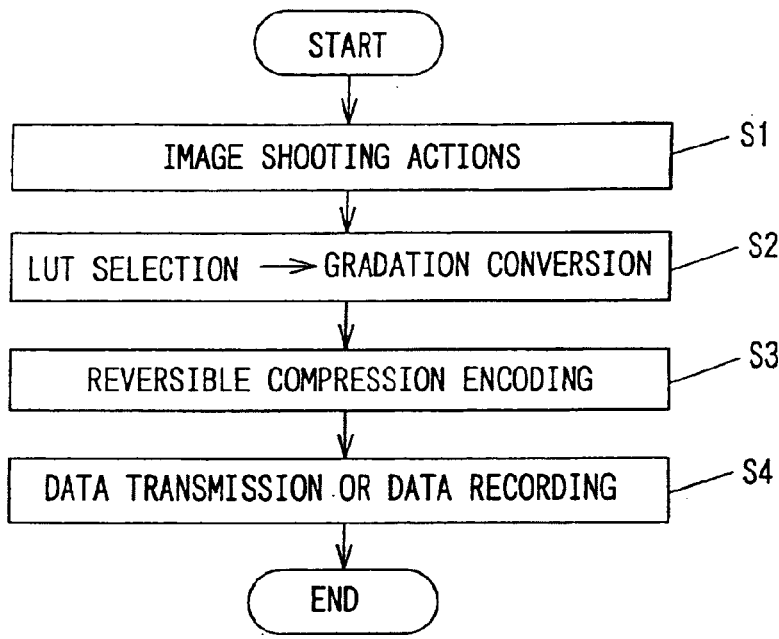
FIG. 2 is a flowchart explaining the image shooting action of the electronic camera 11.

FIG. 2 is a flowchart explaining the image shooting action of the electronic camera 11.

Figure 3:
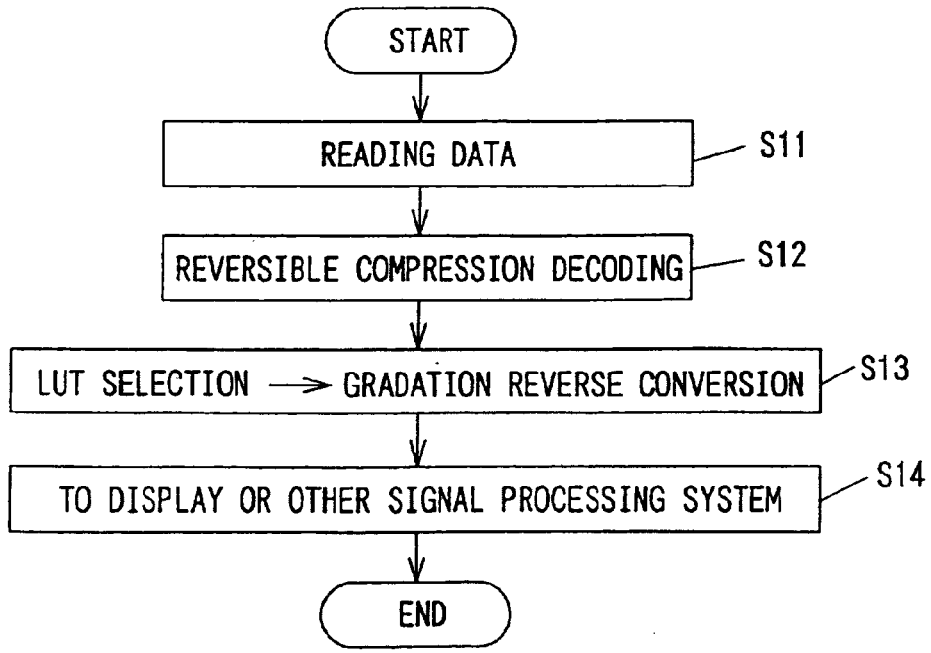
FIG. 3 is a flowchart explaining the playback action of the electronic camera 11.

FIG. 3 is a flowchart explaining the playback action of the electronic camera 11.

First, the image shooting action of an electronic camera 11 will be described with reference to FIG. 1 and FIG. 2. An image shooting lens 12 is mounted in the electronic camera 11. An image of the object is formed on the imaging surface of the imaging element 13 by this photographic lens 12. This imaging element 13 generates an image signal by photo-electrically converting the object image in accordance with the release operation or the like (S1 in FIG. 2).

After executing a black level clamp process or the like via a signal processing unit 14, the image signal is digitally converted to 12-bit raw data for each color by an A/D converter 15.

Based on operational information of an operation unit 23, a CPU 19 selects an LUT (look up table) for gradation conversion from a ROM 19a and conveys the selected LUT to a gradation conversion unit 16. The gradation conversion unit 16 performs gradation conversion of the raw data in accordance with the conveyed LUT (S2 in FIG. 2.)

The raw data that has been performed with gradation conversion by the gradation conversion unit 16 is successively output to a bus 17. An image compression unit 20 executes reversible compression (e.g., DPCM compression) on this raw data while using a buffer memory 18 as a temporary storage (S3 in FIG. 2).

The CPU 19 creates a compressed image file by attaching LUT identifying information and the like to the raw data that has been reversibly compressed, and stores this in a memory card 21 (S4 in FIG. 2).

Through the above-described series of actions, the image shooting action of the electronic camera 11 is completed.

Next, the playback action of the electronic camera 11 will be summarized with reference to FIG. 1 and FIG. 3. This playback action is not limited to the electronic camera 11, but of course, it can be executed using a computer or the like as well.

First, the CPU 19 reads the compressed image file from the memory card 21 (S11 in FIG. 3). The CPU 19 decompresses this compressed image file and restores it to the raw data prior to reversible compression (S12 in FIG. 3).

Furthermore, the CPU 19 selects the LUT for gradation reverse conversion from the ROM 19a based on the LUT identification information in the compressed image file, and conveys the selected LUT to the gradation conversion unit 16. The gradation conversion unit 16 performs the gradation reverse conversion on the raw data in accordance with the conveyed LUT (S13 in FIG. 3).

The CPU 19 and the raw data in which the gradation has been thus restored are output to a monitor display unit 22 and another signal processing system (S14 in FIG. 3).

Through the above-described series of actions, the playback action of the electronic camera 11 is completed.

(Relationship Between Descriptions in Claims and Present Embodiment)

With regard to the relationship between descriptions the claims and the present embodiment, the dark area gradation conversion unit corresponds to the "function that performs gradation conversion on the dark region" of the CPU 19 and the gradation conversion unit 16, and the bright area gradation conversion unit corresponds to the "function that performs gradation conversion on the bright region" of the CPU 19 and the gradation conversion unit 16.

(Steps for Creating Gradation Conversion Characteristic)

Hereafter, steps for creating the LUT (the gradation conversion characteristic β in FIG. 4) which is a feature of the present embodiment will be explained. Here, for purposes of explanation, the creator of the LUT is assumed to be a developer of the electronic camera 11.

First, at the time of input into the gradation conversion unit 16, the dependency relationship between the "input gradation value of the image signal" and the "level-dependent average noise amplitude" is determined through actual measurements and theoretical calculations.

For example, in the case of shot noise, taking the number of electrons generated by photoelectric conversion to be Se, in the instantaneous amplitude of the noise (the number of electrons) indicates the Gaussian distribution of the variance $\sqrt{Se}$.

Accordingly, if the conversion process from "the number of generated electrons Se in the imaging element 13" to the "input gradation value X of the gradation conversion unit 16" is substantially linear, the average noise amplitude Nx of the shot noise at the output gradation value X can be expressed, using a suitable proportionality coefficient B, as:

$$Nx = B \cdot \sqrt{X} \quad [6]$$

(However, if a gamma conversion or other nonlinear curve exists in the conversion process from the number of generated electrons Se to the input gradation value X, an equation for average noise amplitude Nx being calculated to include the effects of that nonlinear curve is used below.)

Here, the average noise amplitude Ny after gradation conversion becomes:

$$Ny \approx Nx \cdot (dY/dX) = B \cdot \sqrt{X} \cdot (dY/dX) \quad [7]$$

When a gradation conversion equation that equalizes the average noise amplitude Ny after gradation conversion is determined with Ny as a constant in this Equation [7], the following equation is obtained:

$$Y = A \cdot \sqrt{X} + C \quad [8]$$

Here, A is a proportionality coefficient and C is the offset value.

Assuming the gradation conversion using this Equation [8] is executed over all regions of the input gradation value X, the following equation that obtained is from the initial condition that X=Y=0:

$$Y = A \cdot \sqrt{X} \quad [9]$$

Figure 4:
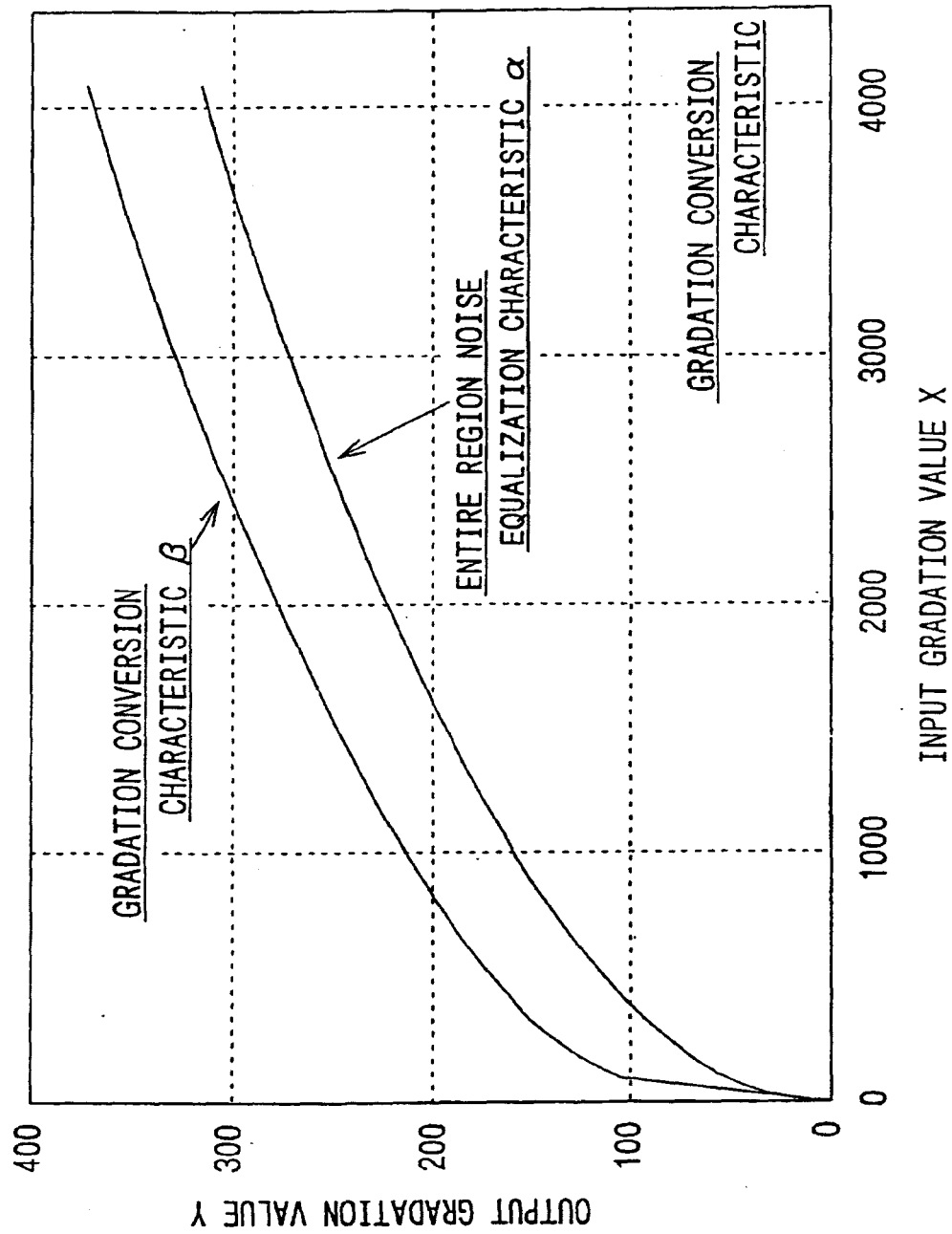
FIG. 4 is a diagram showing the gradation conversion characteristic β in a first embodiment.

The entire region noise equalization characteristic α shown in FIG. 4 is a characteristic created by making the calculated result of Equation [9] an integer.

The developer tests the gradation conversion of a test image or the like using this entire region noise equalization characteristic α, and performs the below-described evaluations for the image after gradation restoration (or after gradation conversion): (1) Jumping (or collapse) of gradations generated in the dark region of the image; and (2) Efficacy of reducing useless information through equalization of the shot noise in the dark region of the image.

Based on these evaluation results, the developer classifies the gradation regions of the image signal into a bright region suitable for gradation conversion using Equation [9] and a dark region not suitable for conversion using Equation [9]. For example, from the above evaluation results, the dark region may be considered as the region having the input gradation values [0–107], and the bright region may be considered as the region having the input gradation values [108–4095].

For this dark region, the developer determines a linear gradation conversion equation as described below.

$$Y = X \text{ (where } 0 \leq X \leq 107\text{)} \quad [10]$$

The developer determines the offset value C of Equation [8] and obtains the gradation conversion equation described below for the bright region, so as to be continuous with the gradation conversion characteristic of Equation [10].

$$Y = A \cdot \sqrt{X} + (107 - A \cdot \sqrt{107}) \quad [11]$$

(where A=4.941, and $108 \leq X \leq 4095$)

The developer creates a LUT by making the calculated results from Equation [10] and equation [11] into integers, and stores the created LUT in the ROM 19a. The gradation conversion characteristic β shown in FIG. 4 is a graph of a LUT thus created.

(Efficacy of the First Embodiment)

Hereafter the gradation conversion characteristic β and the entire region noise equalization conversion α will be compared and described with reference to FIGS. 5–7.

Figure 5:
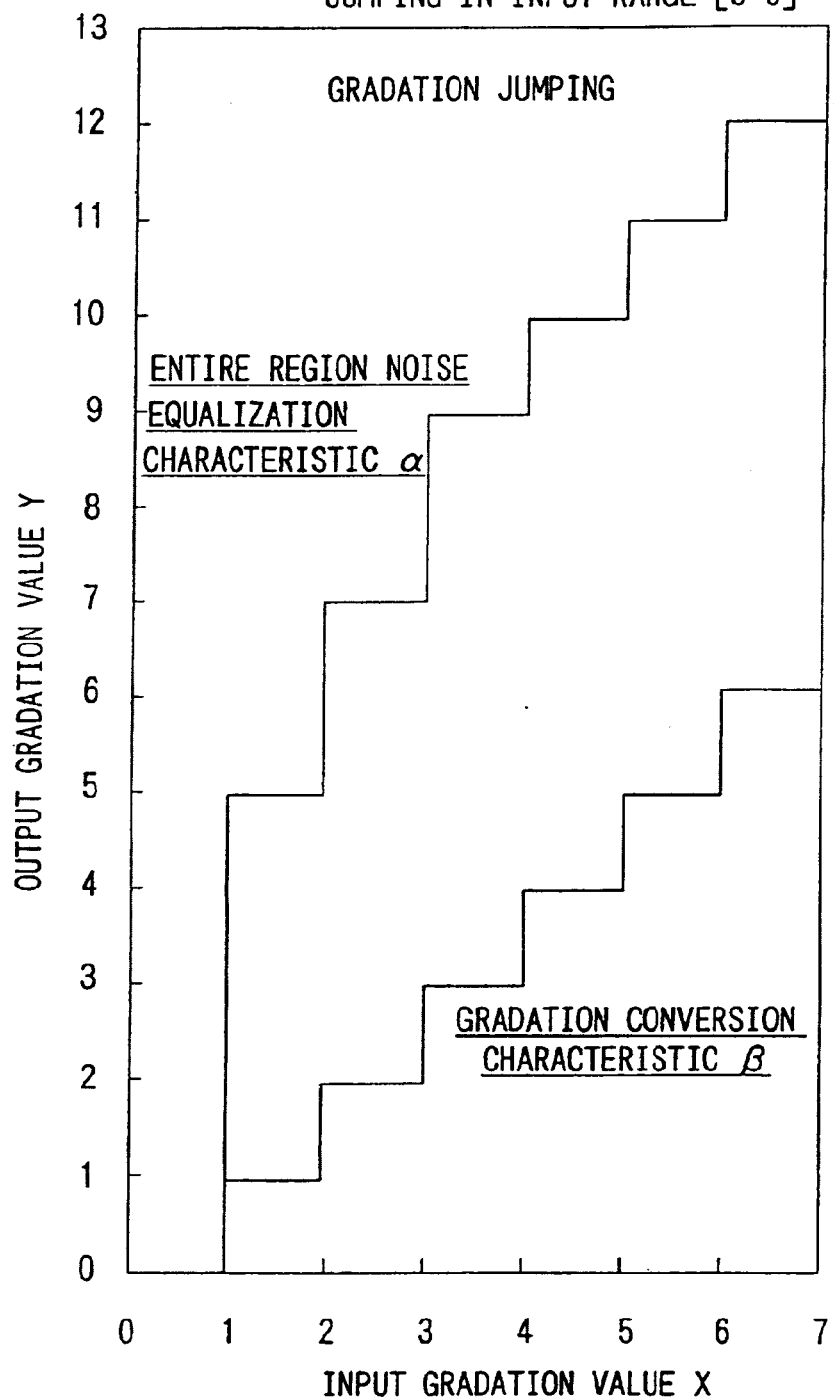
FIG. 5 is a diagram showing the gradation conversion characteristic with input gradation values [0–6].

Efficacy of Improvement by Gradation Conversion Characteristic β Shown in FIG. 5

FIG. 5 is a diagram showing the gradation conversion characteristic in the input gradation values [0–6].

With the entire region noise equalization conversion α, the output gradation values in the input gradation values [0–6] take on discrete values, as shown in FIG. 5. For example, when the input gradation value changes from 0 to 1, the output gradation value quickly jumps from 0 to 5. In a range of the output gradation values Y, ineffectiveness occurs due to such discrete output gradation values. Consequently, the entire region noise equalization conversion α is not preferable from the standpoint of effective use of the range of the output gradation value Y. Furthermore, when the input gradation value fluctuates between 0 and 1 due to fixed pattern noise or dark current, with the entire region noise equalization conversion α, the noise fluctuation amplitude is amplified to 5. This amplified noise easily spreads to the surrounding regions by subsequent interpolation processes and low-pass processes, which can have a severe influence. Accordingly, the entire noise equalization conversion α is not preferable from the standpoint of noise reduction in the dark region either.

On the other hand, with the gradation conversion characteristic β of the present embodiment, the output gradation value does not take on discrete values, as shown in FIG. 5. Accordingly, with the gradation conversion characteristic β, useless output gradation values do not exist, making it possible to effectively utilize the range of the output gradation value Y. Furthermore, when the input gradation value fluctuates between 0 and 1 due to fixed pattern noise or dark current, with the gradation conversion characteristic β the noise fluctuation amplitude is not amplified. Accordingly, the noise in the dark region does not stand out unnecessarily, and the amplified noise does not spread to surrounding regions, enabling extremely good image quality to be obtained.

Figure 6:
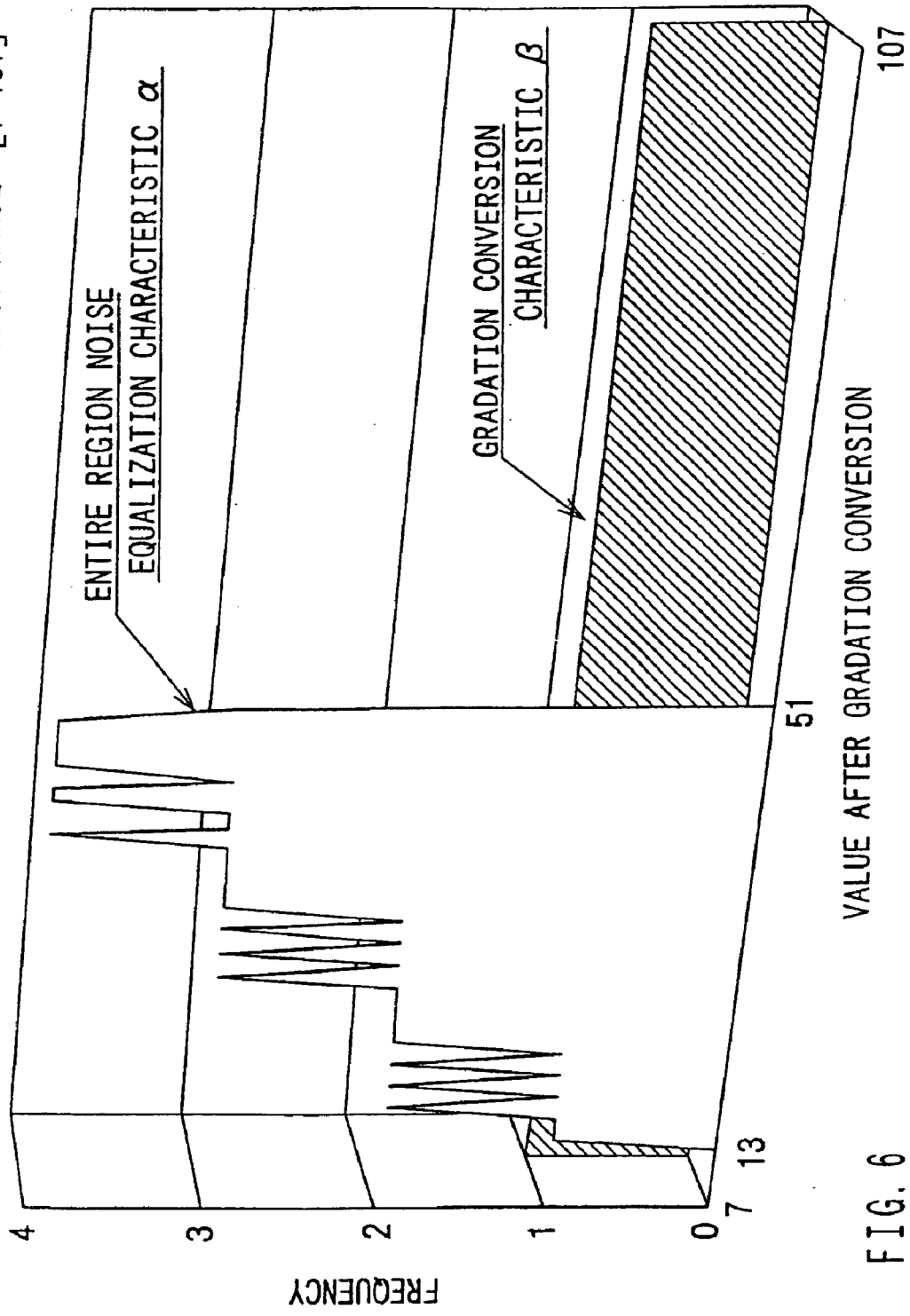
FIG. 6 is a diagram showing a histogram after gradation conversion with input gradation values [7–107]

Efficacy of Improvement by Gradation Conversion Characteristic β Shown in FIG. 6

FIG. 6 is a diagram showing a histogram after gradation conversion in the input gradation values [7–107].

With the entire region noise equalization conversion α, the input gradation values [7–107] are gradation-compressed to output gradation values [13–51], as shown in FIG. 6. The gradation collapse in this gradation region largely loses the details of shadows and hair, consequently losing much image quality. In addition, when gradation restoration is conducted during playback, the restored gradation values become 39 discrete values in the gradation region of values [7–107]. Consequently, the histogram after gradation restoration takes on a sawtooth appearance, and the smooth gradation appearance of the shadowy areas is largely lost.

On the other hand, the gradation conversion characteristic β of the present embodiment performs the gradation conversion of the input gradation values [7–107] to the output gradation values [7–107] without any change, as shown in FIG. 6. Consequently, details such as shadows and hair are preserved completely, enabling the smoothness and richness of the gradation to be accurately maintained.

Figure 7:
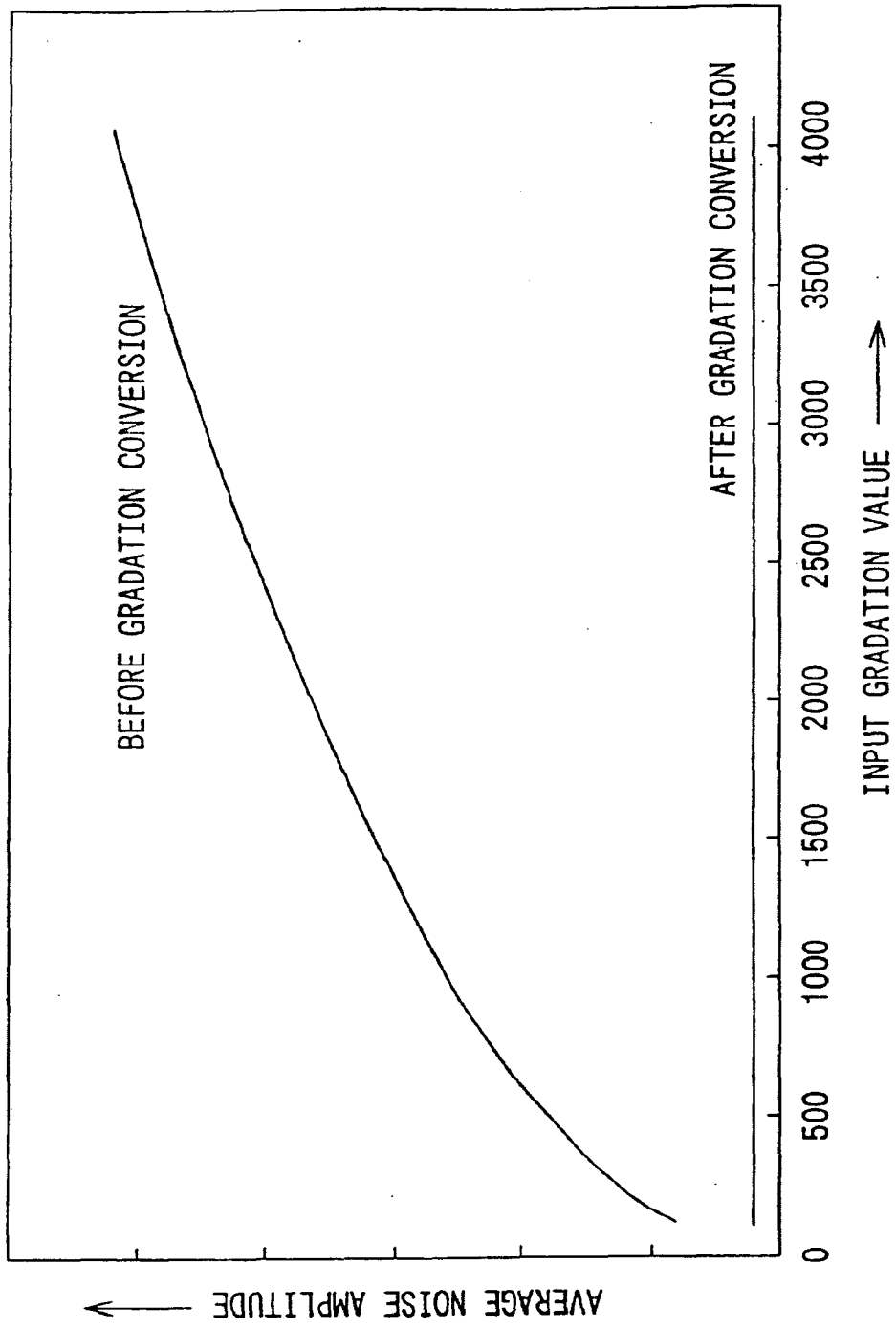
FIG. 7 is a diagram showing the equalization effect for noise amplitude with input gradation values [108–4095].

Efficacy of Improvement by Gradation Conversion Characteristic β Shown in FIG. 7

FIG. 7 is a diagram showing the efficacy in equalization of noise amplitude in the input gradation values [108–4095].

In the gradation conversion characteristic β of the present embodiment, with the input gradation values [108–4095] in the bright region, the average noise amplitude of the shot noise is also equalized after gradation conversion. In this gradation region [108–4095], the shot noise is large because of the large signal level of the image signal, and consequently the percentage of shot noise in the entire noise is relatively high. Accordingly, by equalizing the average amplitude of the shot noise in this input range [108–4095], the noise in the image signal is equally reduced, making it possible to realize noise reduction and an improved compression rate.

Efficacy of Improvement by Continuity of Gradation Conversion Characteristic β

In the aforementioned Equation [11], the gradation conversion characteristics in both regions are made continuous by adjusting the offset value C. Accordingly, the gradation does not become discontinuous or reverse at the image boundary of the two regions, making it possible to preserve a natural gradation change. In addition, when gradation restoration is performed, gradation reversal does not occur at the image boundary between the two regions, and consequently it is possible to accomplish gradation restoration with earnestness.

Next, another embodiment will be described.

Second Embodiment

The structure of the electronic camera of the second embodiment is the same as that of the first embodiment (FIG. 1), and hence description of such is omitted.

The feature points in the action of the second embodiment are as follows:

(1) A plurality of LUTs (gradation conversion characteristics) are stored in advance in the ROM 19a;
(2) The image compression unit 20 can select whether or not to perform reversible compression; and
(3) The CPU 19, in accordance with the user setting of the compression mode input from the control unit 23, decides "selection of whether or not to perform a gradation conversion characteristic", "selection of a LUT when gradation conversion is to be performed", and "selection of whether or not to perform reversible compression," and controls storing process of the raw data.

Below, the feature points for each compression mode provided in the electronic camera 11 are described.

Non-Compression Mode (Corresponding to the Non-Compression Mode Described in the Claims)
Gradation conversion . . . No
Reversible compression . . . No The non-compression mode is a mode that records without change the raw data output from the A/D converter 15. Accordingly, the raw data can be restored perfectly. When the number of pixels in the image signal is 2000×1312 and there are 12 bits of data per pixel, the storage capacity needed for the image signal is about 4 megabytes.

Completely Lossless Mode (Corresponding to the Second Compression Mode Described in the Claims)
Gradation conversion . . . No
Reversible compression . . . Yes The complete lossless mode is a mode that reversibly compresses and stores digital image data output from the A/D converter 15. Accordingly, it is possible to perfectly restore the raw data through reversible decompression. The storage capacity needed for a general image signal is about 2.8 megabytes (70% compression ratio).

Figure 8:
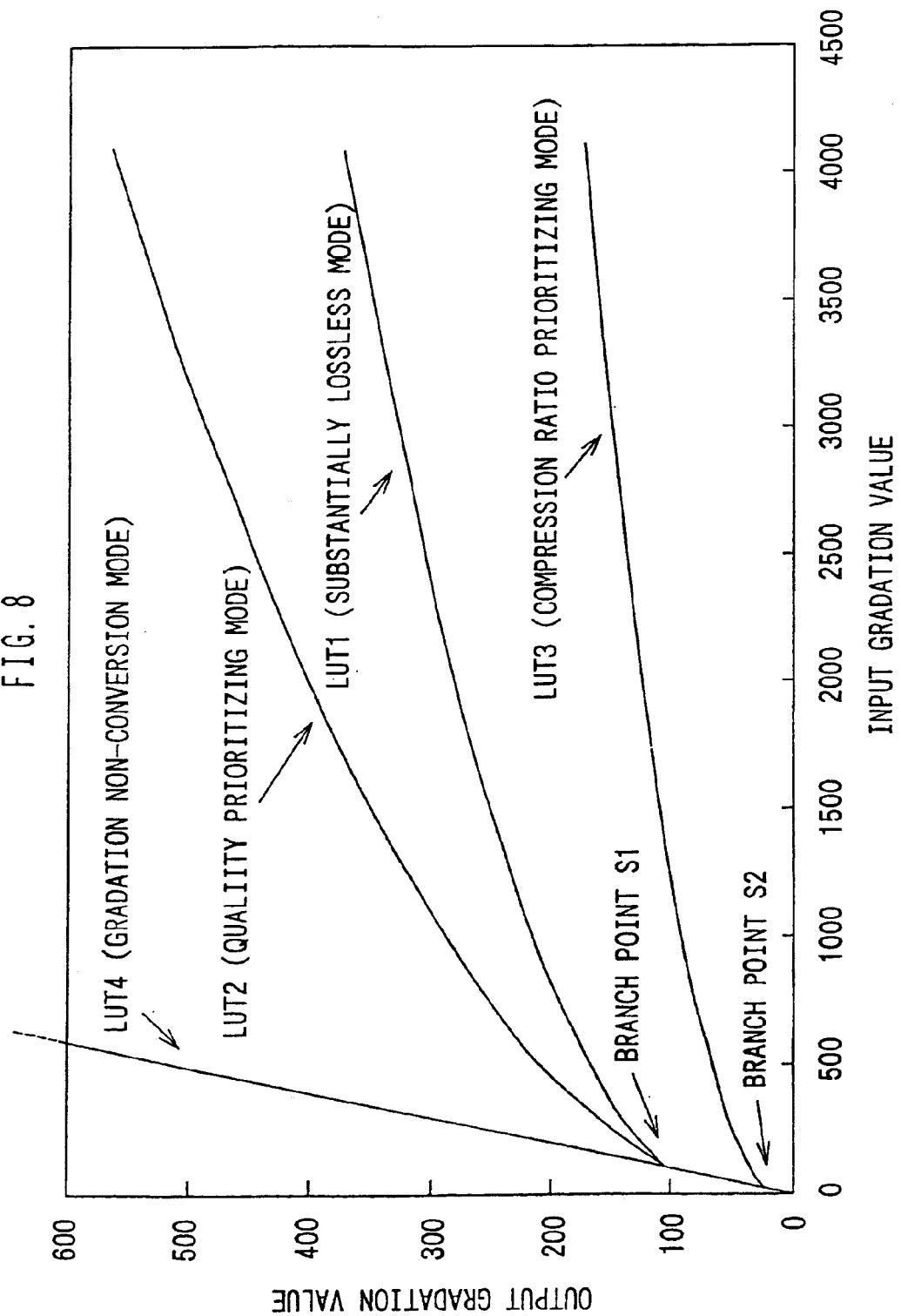
FIG. 8 is a diagram showing the gradation conversion characteristic of a second embodiment.

Substantially Lossless Mode (Corresponding to the First Compression Mode Described in the Claims)
Gradation conversion . . . LUT1 in FIG. 8
Reversible compression . . . Yes The substantially lossless mode is a mode that performs gradation conversion using linear conversion in the dark region [0–107], and equalizes the average noise amplitude of the shot noise and approximately levels a quantified step amplitude in the bright region [108–4095]. In this case, the shot noise in the bright region is mostly eliminated, and the storage capacity needed for the image signal is reduced by that much. The storage capacity needed for a general image signal is about 2 megabytes (50% compression ratio).

Quality Prioritizing Mode (Corresponding to the First Compression Mode Described in the Claims)
Gradation conversion . . . LUT2 in FIG. 8
Reversible compression . . . Yes The quality prioritizing mode is a mode that performs gradation conversion using linear conversion in the dark region [0–107] and reduces the quantification steps in the bright region [108–4095] compared with the substantially lossless mode. Specifically, the proportionality coefficient A in Equation [11] is increased. In this case, it is possible to avoid gradation collapse in the bright region, while the shot noise in the bright region is eliminated by a small amount by gradation conversion. As a result, it is also possible to reduce the sawtooth characteristic created in the histogram. With this quality prioritizing mode, the storage capacity needed for a general image signal becomes about 2.4 megabytes (60% compression ratio).

Compression Ratio Prioritizing Mode (Corresponding to the First Compression Mode Described in the Claims)
Gradation conversion . . . LUT3 in FIG. 8
Reversible compression . . . Yes The quality prioritizing mode is a mode that performs gradation conversion using linear conversion in the dark region [0–27] and increases the quantification steps in the bright region [28–4095] compared with the substantially lossless mode. In this case, the range of the bright region expands (from branch point S1 to S2), while the gradation compression in the bright region becomes stronger. Specifically, the proportionality coefficient A in Equation [11] is reduced, and the offset value C is altered. In this case, it is possible to improve further the compression ratio of the raw data. With this compression ratio prioritizing mode, the storage capacity needed for a general image signal becomes about 1.6 megabytes (40% compression ratio).

Supplemental Items for the Embodiments

In the above-described embodiments, the preferred embodiments of the electronic camera 11 have been described. However, the present invention is not limited by these embodiments. As described in the claims, an image processing program for executing the gradation conversion of the present invention on a computer may be created. In addition, this image processing program may be stored on a recording medium. Using this image processing program, it is possible to execute the gradation conversion of the present invention on a computer.

In addition, in the above-described embodiments, the average noise amplitude is equalized across all areas of the bright region, but the present invention is not limited by this. As described in the claims, linear conversion may also be performed in the brightest region in the bright region. In this case, gradation collapse and the like in the brightest region (e.g., the indentation pattern on a white cup) is reduced, making it possible to increase extremely effectively the gradation reproducibility of the image. FIG. 9 is a diagram showing one example of this kind of gradation conversion characteristic.

Furthermore, in the above-described embodiments, the case wherein gradation conversion is performed using LUTs was described, but the present invention is not limited by this. For example, it naturally does not matter even if the output gradation value Y is computed from the input gradation value X in accordance with arithmetic expressions, such as Equation [10] or Equation [11]. In addition, in this case, an integer arithmetic expression may be used as the arithmetic expression, and the calculated output gradation value Y may be made into an integer therefore. Additionally, the present invention may also be applied to gradation conversion of an analog image signal of course.

In addition, in the above-described embodiments, the LUTs is created after continuous gradation conversion equations are derived, but the present invention is not limited by this. For example, the LUTs may be created directly by setting the quantification steps in the bright region (corresponding to the "slope" described in the claims) in proportion to the average noise amplitude on the input side while setting the offset value such that the branch points of the dark region and the bright region substantially connect (corresponding to the "continuous" described in the claims). As such, the terms "slope" and "continuous" described in the claims are not to be given a limited interpretation only for continuity, but an expanded interpretation covering dispersion is also possible.

The present invention can also be performed in various forms without deviating from its spirit or the primary features. Consequently, the aforementioned embodiments are simply illustrations in all respects and must not be interpreted as being limiting. The scope of the present invention is shown by the scope of claims, and is not restricted in any way by the specification. Furthermore, variations and changes belonging to a scope equivalent to the scope of claims are all within the scope of the present invention.

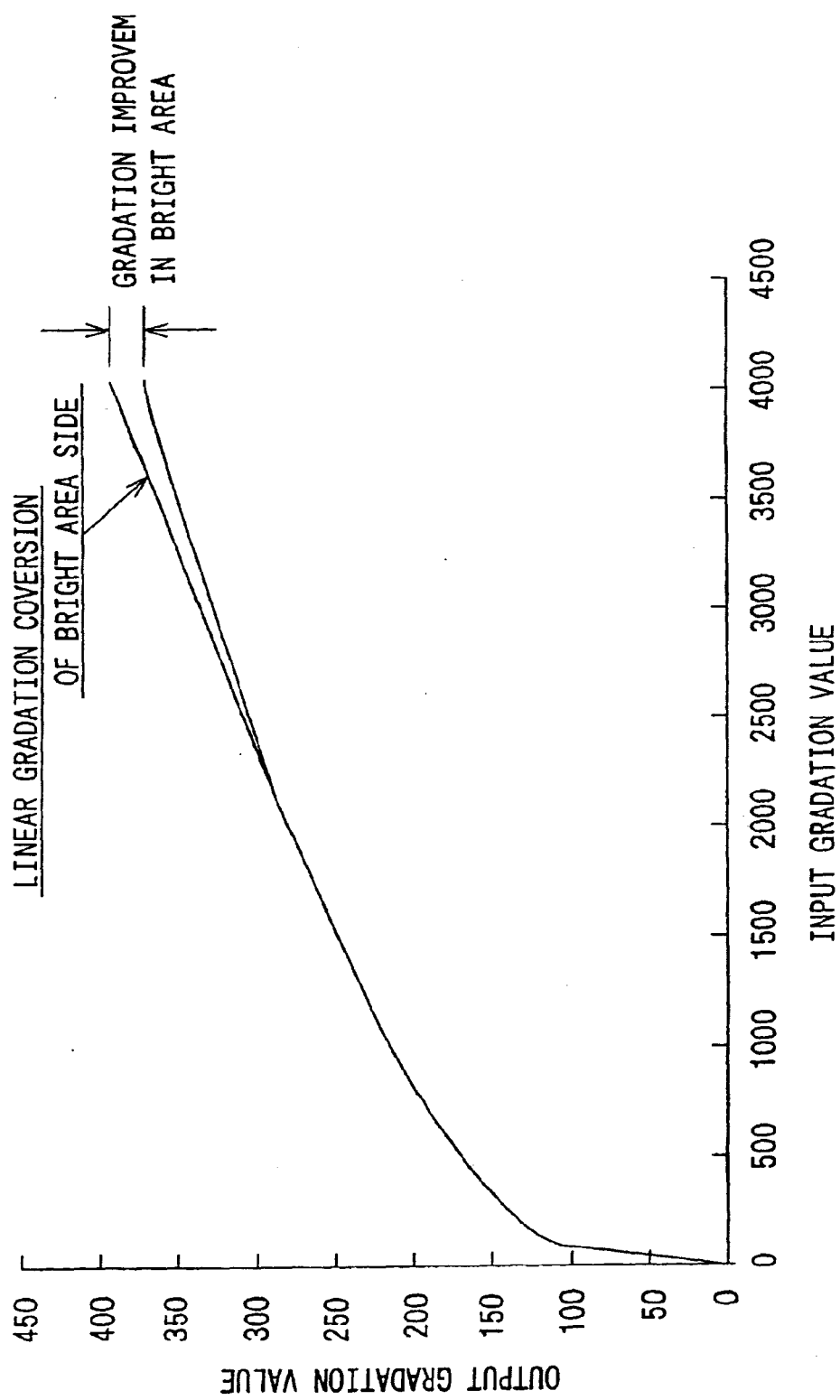

What is claimed is:

1. An electronic camera that performs gradation conversion with respect to a photographed image signal, comprising:

a dark area gradation conversion unit that performs gradation conversion on the image signal in accordance with a linear conversion characteristic when an input gradation value of the image signal is darker than a preset value; and a bright area gradation conversion unit that performs gradation conversion on the image signal in accordance with a nonlinear characteristic when the input gradation value of the image signal is brighter than the preset value;

wherein the nonlinear characteristic satisfies both of the following conditions:

(1) the nonlinear characteristic has a slope that substantially equalizes an average noise amplitude of the image signal without being based on the output gradation value; and (2) the nonlinear characteristic is offset so as to be continuous with a gradation conversion characteristic of the dark area gradation conversion unit.

2. The electronic camera according to claim 1, wherein the dark area gradation conversion unit outputs the input gradation value X as the output gradation value Y without any change.

3. The electronic camera according to claim 1, wherein the bright area gradation conversion unit outputs the output gradation value Y of the following equation:

$$Y = A \cdot \sqrt{X} + C$$

where X is the input gradation value, A is a proportionality coefficient, and C is an offset value to adjusted for making continuous with the characteristic of the dark area gradation conversion unit).

4. The electronic camera according to claim 1, wherein when the input gradation value of the image signal is brighter than a second preset value, the bright area gradation conversion unit performs gradation conversion of the image signal in accordance with a linear conversion characteristic continuous with the nonlinear gradation conversion characteristic.

5. The electronic camera according to claim 1, wherein at the bright area gradation conversion unit and the dark area gradation conversion unit, at least two combinations of gradation conversion characteristics are provided in advance, either one of which can be selected.

6. The electronic camera according to claim 1, further comprising with a data compression unit having at least a first compression mode that compresses data of the image signal after performing gradation conversion on the image signal through the dark area gradation conversion unit or the bright area gradation conversion unit, and a second compression mode that compresses data of the image signal without the signal passing through the dark area gradation conversion unit or the bright area gradation conversion unit, wherein either one of the modes can be selected.

7. The electronic camera according to claim 1, further comprising a data compression unit having at least a first compression mode that compresses data of the image signal after performing gradation conversion on the image signal through the dark area gradation conversion unit or the bright area gradation conversion unit, and a non-compression mode that does not pass through the dark area gradation conversion unit or the bright area gradation conversion unit and does not compress the data of the image signal, wherein either one of the modes can be selected.

8. An image processing program which allows a computer to function as:

(a) a dark area gradation conversion unit that performs gradation conversion on an image signal in accordance with a linear conversion characteristic, when an input gradation value of the image signal is darker than a preset value; and (b) a bright area gradation conversion unit that performs gradation conversion on an image signal in accordance with a nonlinear characteristic, when the input gradation value of the image signal is brighter than a preset value, the nonlinear characteristic satisfying both of the following conditions:

(1) the nonlinear characteristic has a slope that substantially equalizes an average noise amplitude of the image signal without being based on the output gradation value; and (2) the nonlinear characteristic is offset so as to be continuous with a gradation conversion characteristic of the dark area gradation conversion unit.

9. A mechanically readable recording medium that stores the image processing program according to claim 8.

10. An image processing method for performing gradation conversion with respect to an input image signal, comprising:

a dark area gradation conversion step for performing gradation conversion on the image signal in accordance with a linear conversion characteristic when an input gradation value of the image signal is darker than a preset value; and, a bright area gradation conversion step for performing gradation conversion on the image signal in accordance with a nonlinear characteristic when the input gradation value of the image signal is brighter than a preset value, the nonlinear characteristic satisfying both of the following conditions:

(1) the nonlinear characteristic has a slope that equalizes an average noise amplitude of the image signal without being based on the output gradation value; and (2) the nonlinear characteristic is offset so as to be continuous with a gradation conversion characteristic of the dark area gradation conversion unit.

* * * * *

UNITED STATES PATENT AND TRADEMARK OFFICE
CERTIFICATE OF CORRECTION

PATENT NO. : 6,906,747 B2
APPLICATION NO. : 09/913062
DATED : June 14, 2005
INVENTOR(S) : Sadami Okada It is certified that error appears in the above-identified patent and that said Letters Patent is hereby corrected as shown below:

IN THE SPECIFICATION:

Column 2, line 32, change "solid" to --fixed--;

Column 6, line 5, delete current paragraph and insert therefor:

--The CPU 19 outputs the raw data in which the gradation has been thus restored to a monitor display unit 22 and another signal processing system (S14 in Fig. 3).--;

IN THE DRAWINGS:

Please replace the drawings with the attached Replacement Formal Drawings. Figs. 1-8

Signed and Sealed this

Tenth Day of October, 2006

JON W. DUDAS
*Director of the United States Patent and Trademark Office*

ACTIONS DURING IMAGE SHOOTING

ACTIONS DURING PLAYBACK